Dec. 16, 1924.

M. JUHASZ

SPRING WHEEL

Filed Jan. 31, 1924

1,519,542

Inventor
M. Juhasz

By
J. K. Bryant
Attorney

Patented Dec. 16, 1924.

1,519,542

UNITED STATES PATENT OFFICE.

MIKE JUHASZ, OF DOVER, OHIO, ASSIGNOR OF ONE-HALF TO LAJOSZ KALLO, OF DOVER, OHIO.

SPRING WHEEL.

Application filed January 31, 1924. Serial No. 689,728.

*To all whom it may concern:*

Be it known that I, MIKE JUHASZ, a citizen of Yugoslavia, residing at Dover, in the county of Tuscarawas and State of Ohio, have invented certain new and useful Improvements in Spring Wheels, of which the following is a specification.

This invention relates to certain new and useful improvements in spring wheels and has for one of its objects to provide a wheel embodying a rigid inner band or felly and a sectional outer rim positioned outwardly of the felly with spring devices interposed between the felly and rim.

Another object of the invention is to provide a spring wheel of the type above set forth wherein the outer rim is formed of sections arranged in spaced relation with spring devices interposed between the sections permitting limited circumferential movement thereof relative to the axle supporting the wheel.

With the above general objects in view and others that will appear as the nature of the invention is better understood, the same consists of the novel form, combination and arrangement of parts hereinafter more fully described, shown in the accompanying drawing and claimed.

Figure 1:
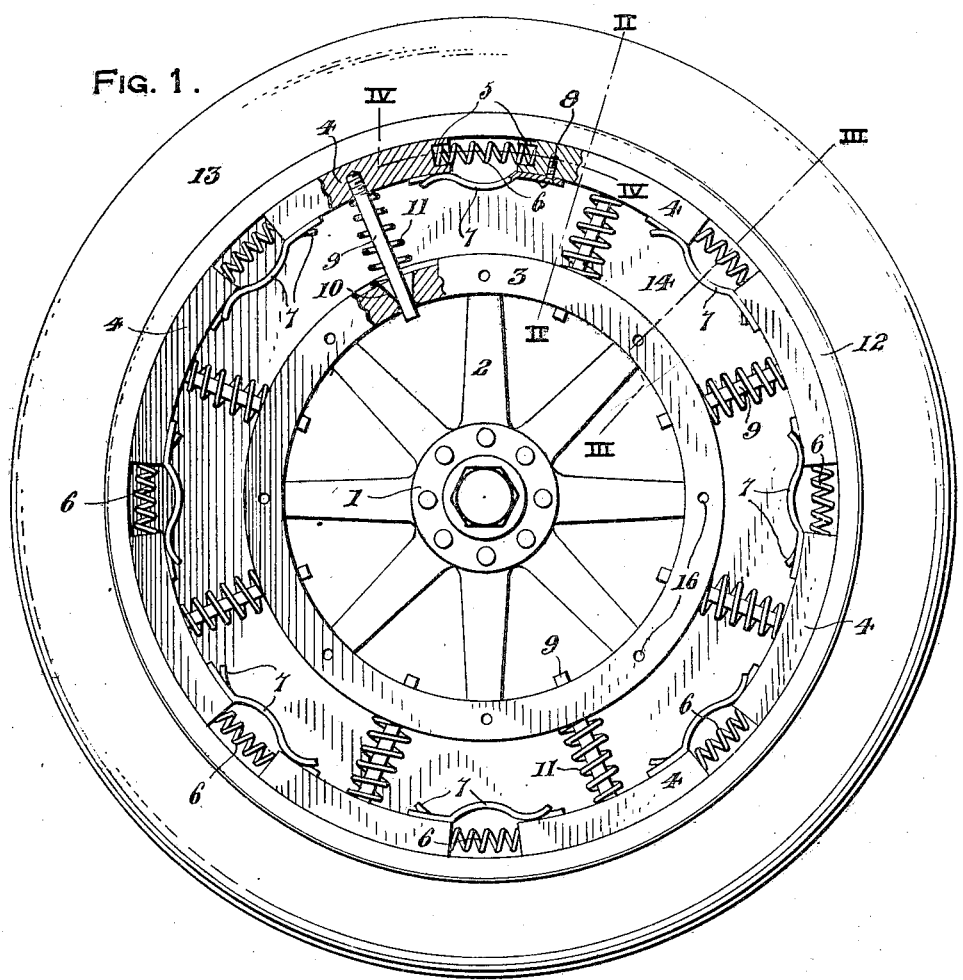
Figure 2:
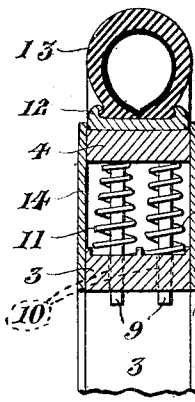
Figure 3:
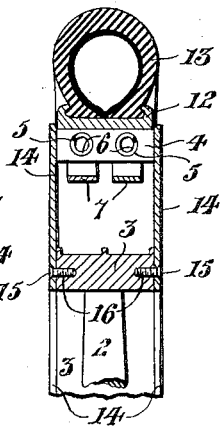
Figure 4:
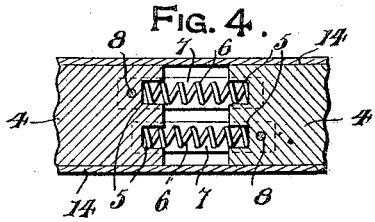

In the drawing, wherein like reference characters designate corresponding parts throughout the several views, Figure 1 is a side elevational view with one of the side plates of the wheel removed and other parts broken away and shown in section to illustrate the spring devices interposed between the inner and outer rims and the spring devices between the outer rim sections, Figure 2 is a detail sectional view taken on line II—II of Fig. 1 showing the spring devices interposed between the inner and outer rim sections, Figure 3 is a detail sectional view take on line III—III of Fig. 1, and Figure 4 is a detail sectional view taken on line IV—IV of Fig. 1 showing the spring devices between the outer rim sections.

Referring more in detail to the accompanying drawing there is illustrated a spring wheel especially adapted for use upon motor vehicles and includes a hub portion 1 from which spokes 2 radially extend for anchoring in the rigid felly or inner rim 3.

An outer sectional rim encloses the inner rigid rim and is spaced therefrom by interposed spring devices, the outer rim being formed of spaced sections 4 in the form of arcuate blocks. Each end of the sections 4 is provided with a pair of spaced sockets 5 that register with the corresponding sockets in the end of the adjacent rim section for the reception of the ends of coil springs 6 positioned between the outer rim sections 4 as illustrated in Figs. 1 and 4. Flat springs extend between the inner faces of adjacent ends of the outer rim section 4, the flat springs 7 being respectively secured at opposite ends as at 8 to the inner faces of the rim sections 4 underlying the coil springs 6 as shown in Figs. 3 and 4, this connection permitting limited circumferential movement of the outer rim sections with respect to the wheel hub and rigid inner rim 3.

The spring devices interposed between the inner and outer rim sections include a pair of rods 9 transversely alined and threaded at their outer ends into each outer rim section 4 with the inner ends thereof freely extending through adjacent openings 10 formed in rigid rim 3, the openings 10 flaring outwardly as shown in Fig. 1 to permit a substantial pivoted movement of the rod 9 in the rim 3 when the axle supporting the wheel is subjected to pressure. A coil spring 11 surrounds each rod 9 between the inner and outer rim and places the outer rim sections under tension in an obvious manner.

A tire rim 12 is mounted upon the outer rim sections 4 and supports a pneumatic tire 13 while side plates 14 secured at their inner edges as at 15 by screw devices entering the openings 16 provided in opposite sides of the rigid rim 3 extend outwardly to enclose the outer rim sections 4 as shown in Figs. 2 and 3, the side plates 14 completely enclosing the spring devices above described for protecting the same against damage and preventing the collection of foreign matter therearound.

From the above detail description of the device, it is believed that the construction and operation will at once be apparent, and while there is herein shown and described the preferred embodiment of the present invention, it is nevertheless to be understood that minor changes may be made therein without departing from the spirit and scope of the invention as claimed.

What is claimed as new is:—

1. In a wheel of the type described, a rigid inner rim, a sectional outer rim formed of spaced blocks, coil springs interposed between the ends of the outer rim sections, flat springs connected to one rim section and freely engaging the other rim section and spring devices interposed between the inner rim and each section of the outer rim.

2. In a wheel of the type described, a rigid inner rim, a sectional outer rim formed of spaced blocks, coil springs interposed between the ends of the outer rim sections, flat springs connected to one rim section and freely engaging the other rim section, spring devices interposed between the inner rim and each section of the outer rim, the last named spring devices including rods anchored at their outer ends in the outer rim sections, the inner rim having openings therein flaring outwardly through which the rods freely extend and coil springs surrounding the rods between the inner and outer rims.

In testimony whereof I affix my signature.

MIKE JUHASZ.